(12) United States Patent
Lv

(10) Patent No.: US 9,974,407 B2
(45) Date of Patent: May 22, 2018

(54) VACUUM ELECTRIC KETTLE

(71) Applicant: ZHEJIANG HAERS VACUUM CONTAINERS CO., LTD., Yong Kang, Zhejiang (CN)

(72) Inventor: Qiang Lv, Yong Kang (CN)

(73) Assignee: ZHEJIANG HAERS VACUUM CONTAINERS CO., LTD., Zhejiang (CN)

( * ) Notice: Subject to any disclaimer, the term of this patent is extended or adjusted under 35 U.S.C. 154(b) by 434 days.

(21) Appl. No.: 14/776,492

(22) PCT Filed: May 9, 2013

(86) PCT No.: PCT/CN2013/075399
§ 371 (c)(1),
(2) Date: Sep. 14, 2015

(87) PCT Pub. No.: WO2014/139205
PCT Pub. Date: Sep. 18, 2014

(65) Prior Publication Data
US 2016/0037957 A1    Feb. 11, 2016

(30) Foreign Application Priority Data
Mar. 14, 2013   (CN) .......................... 2013 1 0081182

(51) Int. Cl.
*A47J 27/21*   (2006.01)
*H05B 3/26*   (2006.01)
*H05B 3/04*   (2006.01)

(52) U.S. Cl.
CPC ... *A47J 27/21041* (2013.01); *A47J 27/21166* (2013.01); *H05B 3/04* (2013.01);
(Continued)

(58) Field of Classification Search
None
See application file for complete search history.

(56) References Cited

U.S. PATENT DOCUMENTS 5,908,570 A * 6/1999 Deliens ............. A47J 27/21041
219/438

FOREIGN PATENT DOCUMENTS

| CN | 201585852 U |   | 9/2010 |
| CN | 202960091 U | * | 6/2013 |

(Continued)

OTHER PUBLICATIONS

International Search report, issued in PCT/CN2013/075399, dated Oct. 10, 2013.

*Primary Examiner* — Joseph M Pelham
(74) *Attorney, Agent, or Firm* — Birch, Stewart, Kolasch & Birch, LLP

(57) ABSTRACT

A vacuum electric kettle includes a vacuum layer disposed between a liner and an outer shell with a heating disc component disposed inside. A matched electrical connector is disposed between the heating disc component and the base that includes a disc body compounded with a heating body. A seal ring clamping platform is arranged at the edge of the disc body. At least two elastic supporting legs are integrated with the disc body and disposed below the clamping platform. A supporting leg locating ring and a seal ring limiting rib are disposed on the liner with a seal ring between the limiting rib and the clamping platform. The heating disc component and the kettle body are positioned in a matched mode through the elastic supporting legs and the supporting leg locating ring. No welding is required between the heating disc component and the kettle body of the vacuum electric kettle.

5 Claims, 5 Drawing Sheets

(52) U.S. Cl.
CPC ........... *H05B 3/262* (2013.01); *A47J 27/2105* (2013.01); *H05B 2203/021* (2013.01); *H05B 2203/028* (2013.01)

(56) References Cited

FOREIGN PATENT DOCUMENTS

| | | | | |
|---|---|---|---|---|
| DE | 3618231 | A1 | 12/1987 | |
| FR | 2789868 | A1 * | 8/2000 | ........ A47J 27/21041 |
| FR | 2806283 | A1 * | 9/2001 | ........ A47J 27/21041 |

* cited by examiner

VACUUM ELECTRIC KETTLE

BACKGROUND OF THE INVENTION

1. Field of the Invention

The present invention relates to a vacuum electric kettle.

2. Description of Background Art

A welding technology is often used to join a heating disc component and a double-layer vacuum kettle body of an existing vacuum electric kettle. The welding technology requires a very high dimensional accuracy on a workpiece. When the accuracy between the heating disc component and the double-layer vacuum kettle body does not match well, the heating disc component and the kettle body cannot be welded together. In addition, after the heating disc component and the kettle body are welded together, the heating disc component and the kettle body cannot be disassembled and reworked. When vacuum detection on a sandwiching of the kettle body is not qualified, the whole product is worthless.

In order to solve the above problems, Chinese Patent No. CN201585852U provides an "electric kettle." The technical solution of the electric kettle includes a kettle body and an electric heating apparatus. The kettle body includes an upper kettle body and a lower kettle body that are fixedly joined by means of a threaded connection or snap fit screwing. The lower kettle body includes an outer shell and a liner with a vacuum thermal insulation layer being positioned between the outer shell and the liner. An outer edge of the heating tray is sleeved with a seal ring. The seal ring is installed between the upper kettle body and the lower kettle body. The lower kettle body of the electric kettle uses a vacuum thermal insulation structure, and the electric kettle has a better thermal insulation property.

However, the foregoing electric kettle has the following disadvantages: 1. The seal ring of the electric kettle is installed between the upper kettle body and the lower kettle body, which causes that two kettle bodies, namely, an upper kettle body and a lower kettle body, to be needed to be manufactured separately for the electric kettle, causing inconvenience for manufacture and greatly improving manufacturing costs. 2. The seal ring of the electric kettle is rigidly fixed to the upper kettle body and the lower kettle body, and a sealing effect of the seal ring is not ideal.

OBJECTS AND SUMMARY OF THE INVENTION

An object of an embodiment of the present invention is to provide a vacuum electric kettle that has a simple structure and a reliable sealing performance that can effectively reduce a rejection rate during the production process.

According to an embodiment of the present invention, the foregoing objective is achieved through the following technical solutions.

A vacuum electric kettle, includes a double-layer stainless steel kettle body and a base for placing the kettle body, a vacuum layer is disposed between a liner and an outer shell of the kettle body with a heating disc component being disposed inside the kettle body. A kettle lid and a handle are disposed on the kettle body with a matched electrical connector being disposed between the heating disc component and the base. The heating disc component includes a disc body compounded with a heating body with a seal ring clamping platform being arranged at the edge of the disc body. At least two elastic supporting legs, integrated with the disc body, are disposed below the clamping platform with a supporting leg locating ring and a seal ring limiting rib being disposed on the liner. A seal ring is disposed between the limiting rib and the clamping platform. The heating disc component and the kettle body are positioned in a matched mode through the elastic supporting legs and the supporting leg locating ring.

Advantages of the present invention are provided because the elastic supporting legs are disposed on the disc body, and the heating disc component and the kettle body are positioned in a matched mode through the elastic supporting legs and the supporting leg locating ring, so that a welding technology is not required between the heating disc component and the kettle body. Thus, there is no risk of destroying the vacuum layer. Even if air leaks on the vacuum layer, the heating disc component can be disassembled and reworked, thereby effectively reducing a condemnation rate during the production process. In addition, the vacuum electric kettle of the present invention only needs one kettle body to seal the heating disc component and the kettle body by using the seal ring, so that the structure of the vacuum electric kettle is simple thereby reducing the manufacturing costs. Because of a function of the elastic force between the elastic supporting legs and the supporting leg locating ring, an elastic sealing can be achieved, so that the sealing between the heating disc component and the kettle body is more reliable.

According to an embodiment of the present invention, the disc body is a stainless steel disc, the elastic supporting legs integrated with the disc body are in an extruding-outer shape, and ends of the elastic supporting legs are against to the supporting leg locating ring. The elastic supporting legs use the above structure, which can make the sealing more reliable.

According to an embodiment of the present invention, the supporting leg locating ring and the seal ring limiting rib on the liner are directly formed on the liner, which makes the manufacture more convenient.

According to an embodiment of the present invention, the seal ring limiting rib and the clamping platform cooperate to prevent the seal ring from displacement, which helps to improve reliability of the sealing.

According to an embodiment of the present invention, the outer shell and the liner join up to form the kettle body, and joints are located on a top end and at a bottom end of the outer shell and the liner, which makes the manufacture more convenient.

DETAILED DESCRIPTION OF THE PREFERRED EMBODIMENT

Figure 1:
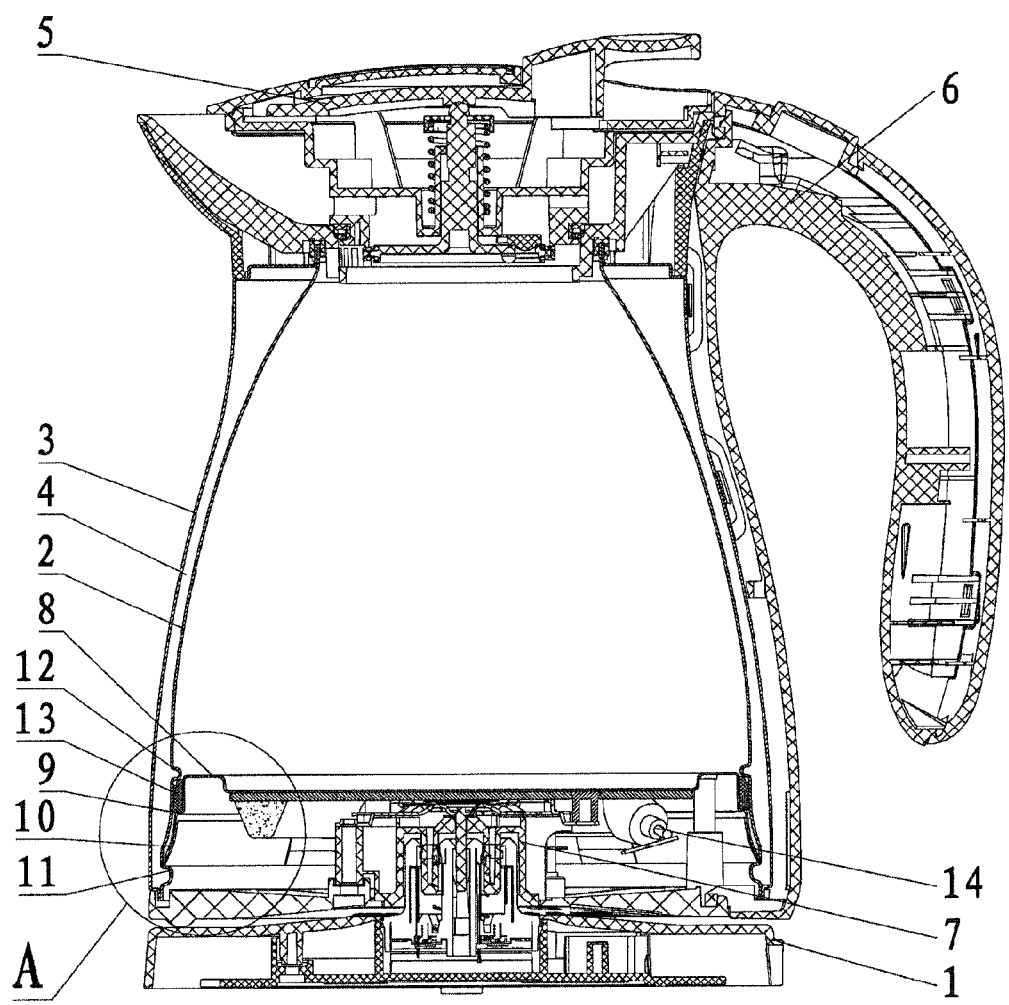
FIG. 1 is a schematic sectional view of a structure of a vacuum electric kettle according to the present invention.
Figure 2:
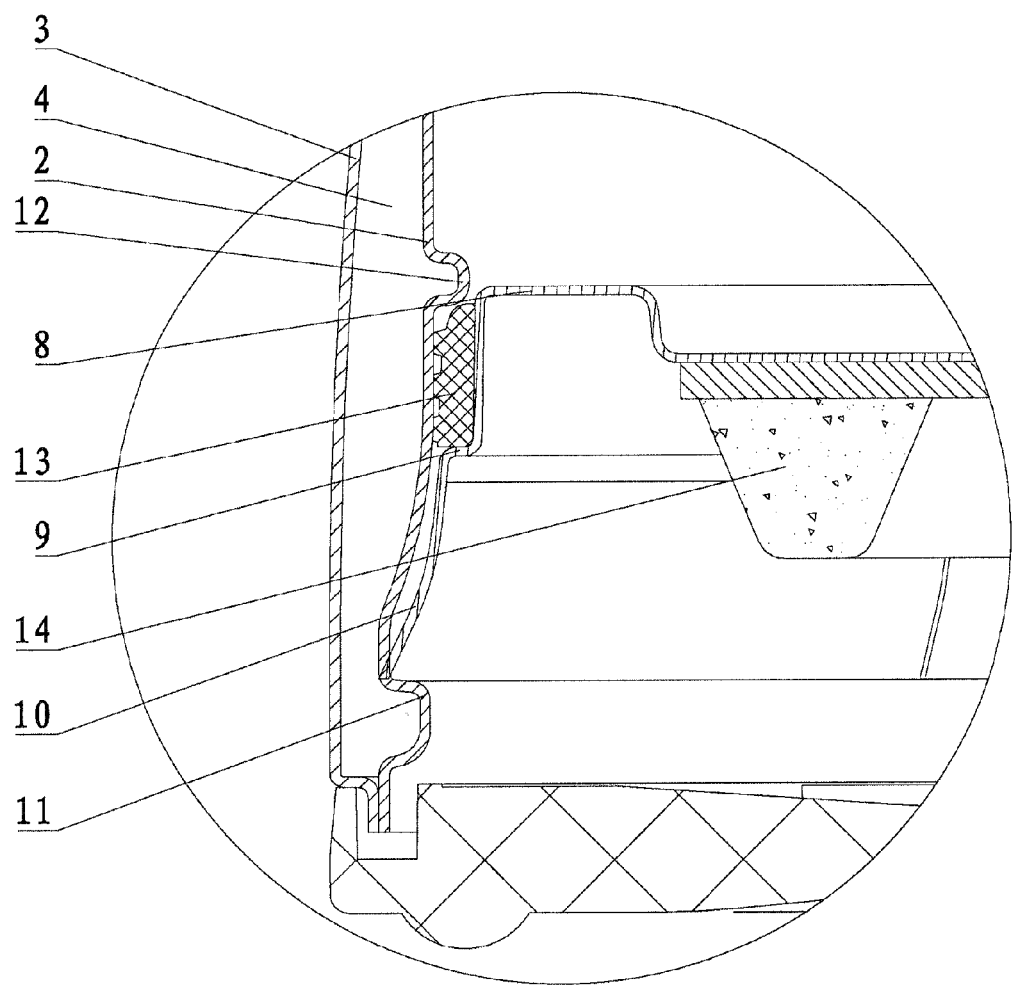
FIG. 2 is an enlarged schematic diagram of an A position in FIG. 1.
Figure 3:
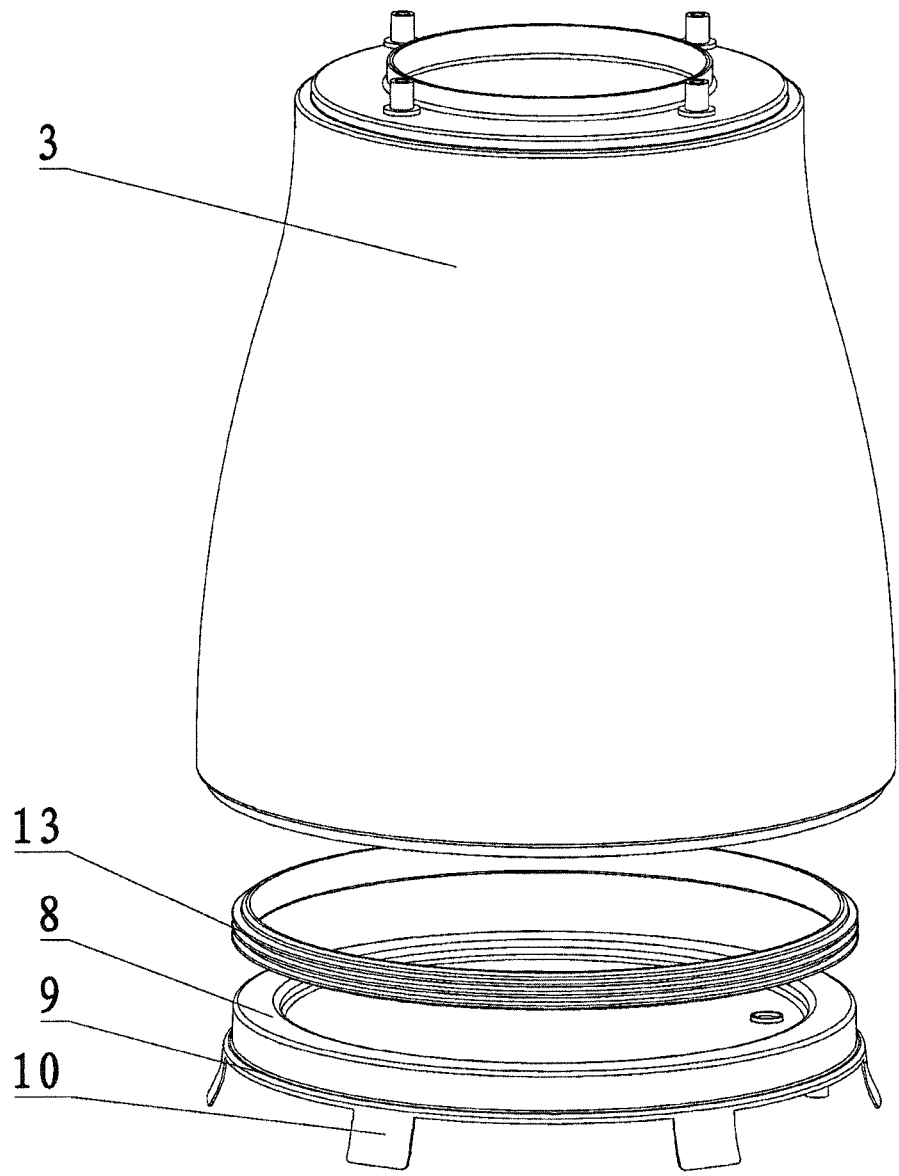
FIG. 3 is a schematic exploded view of components of a kettle body, a seal ring, and a heating disc component according to the present invention.
Figure 4:
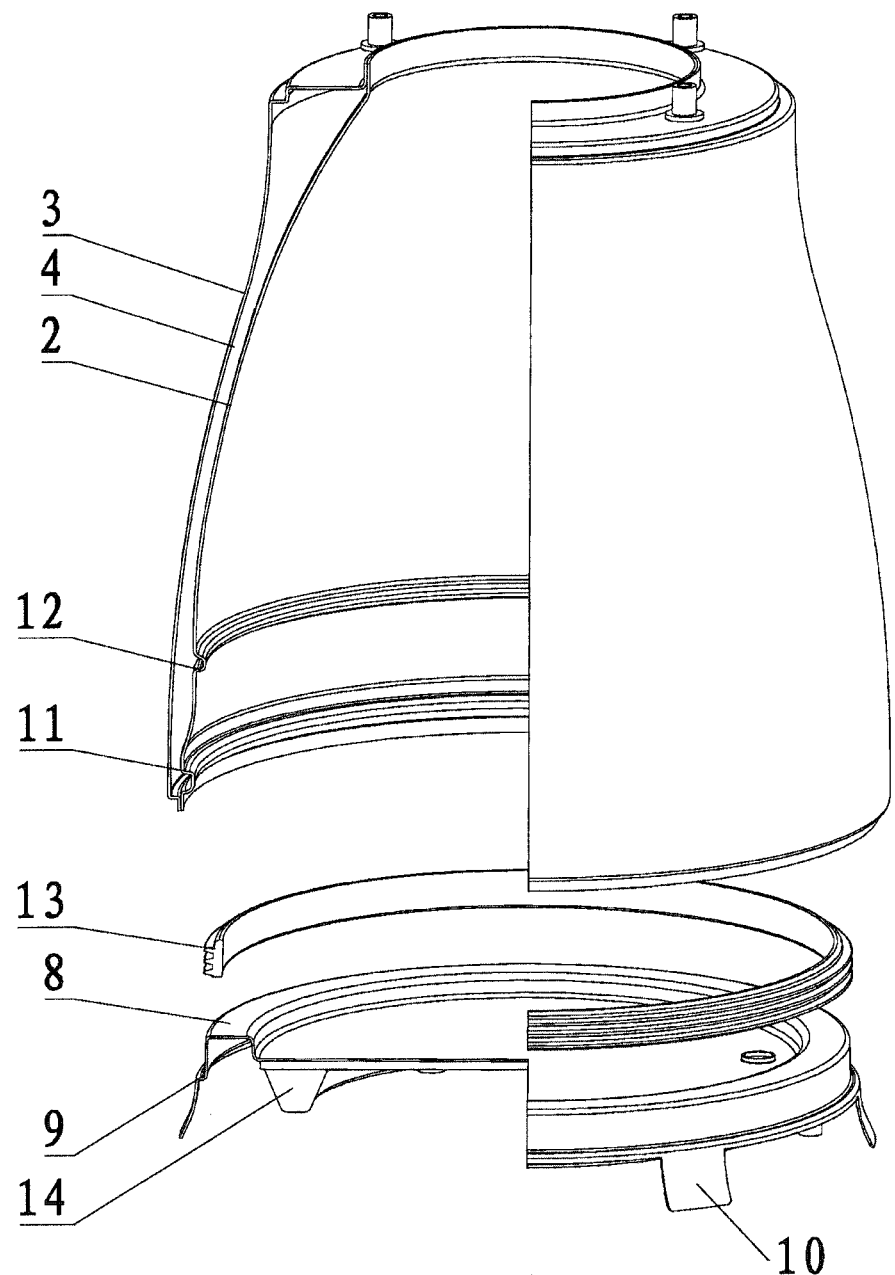
FIG. 4 is an exploded cutaway view of components of a kettle body, a seal ring, and a heating disc component according to the present invention.
Figure 5:
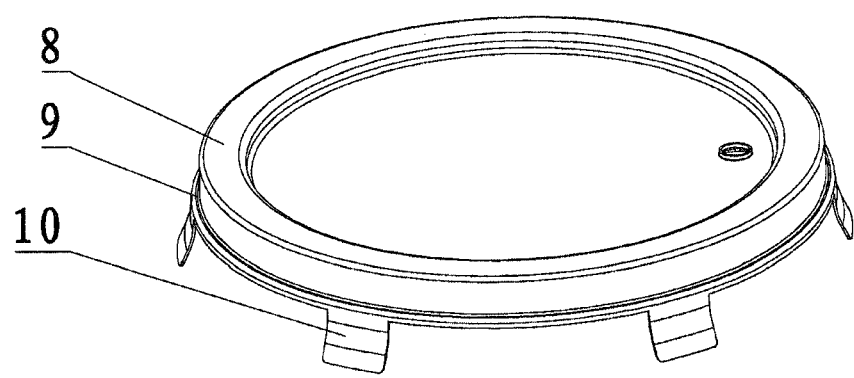
FIG. 5 is a schematic structural diagram of a heating disc component according to the present invention.

As shown in FIG. 1 to FIG. 5, a vacuum electric kettle of an embodiment includes a double-layer stainless steel kettle body and a base 1 for placing the kettle body, where a vacuum layer 4 is disposed between a liner 2 and an outer shell 3 of the kettle body with a heating disc component being disposed inside the kettle body. A kettle lid 5 and a handle 6 are disposed on the kettle body. A matching electrical connector 7 is disposed between the heating disc component and the base. The heating disc component includes a disc body 8 compounded with a heating body, where a seal ring clamping platform 9 is arranged at the edge of the disc body. At least two elastic supporting legs 10, integrated with the disc body, are disposed below the clamping platform. A supporting leg locating ring 11 and a seal ring limiting rib 12 are disposed on the liner with a seal ring 13 being disposed between the limiting rib and the clamping platform. The heating disc component and the kettle body are positioned in a matched mode through the elastic supporting legs 10 and the supporting leg locating ring 11.

In this embodiment, the disc body 8 is a stainless steel disc, the elastic supporting legs 10 integrated with the disc body are in an extruding-outer shape, and ends of the elastic supporting legs 10 are against to the supporting leg locating ring 11. The elastic supporting legs use the above structure, which can make sealing more reliable. The supporting leg locating ring 11 and the seal ring limiting rib 12 on the liner are directly formed on the liner. The seal ring limiting rib 12 and the clamping platform 9 cooperate to prevent the seal ring from displacement. The outer shell and the liner join up to form the kettle body with joints being located on a top end and at a bottom end of the outer shell and the liner.

In this embodiment, the heating body in the disc body 8 compounded with the heating body may be an electric heating tube 14. Certainly, an electric heating film may also be used.

Because the elastic supporting legs are disposed on the disc body, and the heating disc component and the kettle body are positioned in a matched mode through the elastic supporting legs and the supporting leg locating ring, so that a welding technology does not need to be used between the heating disc component and the kettle body, and there is no risk of destroying the vacuum layer. Even if air leaks on the vacuum layer, the heating disc component can be disassembled and reworked, thereby effectively reducing a rejection rate during the production process. In addition, the vacuum electric kettle of the present invention only needs one kettle body to seal the heating disc component and the kettle body by using the seal ring, so that a structure of the vacuum electric kettle is simple, and manufacturing costs are reduced. Because of a function of elastic force between the elastic supporting legs and the supporting leg locating ring, elastic sealing can be achieved, so that the sealing between the heating disc component and the kettle body is more reliable.

The foregoing embodiment is only an individual case of the present invention. Any replacement made according to the spirit of the present invention should be understood as falling within the protection scope of the present invention.

What claimed is:

1. A vacuum electric kettle, comprising:
    a double-layer stainless steel kettle body and a base for placing the kettle body,
    a vacuum layer disposed between a liner and an outer shell of the kettle body,
    a heating disc component operatively disposed inside the kettle body,
    a kettle lid and a handle operatively disposed on the kettle body, and
    a matched electrical connector disposed between the heating disc component and the base,
    wherein the heating disc component comprises:
        a disc body compounded with a heating body,
        a seal ring clamping platform arranged at the edge of the disc body,
        at least two elastic supporting legs integrated with the disc body, said at least two elastic supporting legs being disposed below the clamping platform,
        a supporting leg locating ring and a seal ring limiting rib disposed on the liner,
        a seal ring disposed between the limiting rib and the clamping platform, and the heating disc component and the kettle body are positioned in a matched mode through the elastic supporting legs and the supporting leg locating ring.

2. The vacuum electric kettle according to claim 1, wherein the disc body is a stainless steel disc, the elastic supporting legs integrated with the disc body are in an extruding-outer shape, and ends of the elastic supporting legs are against the supporting leg locating ring.

3. The vacuum electric kettle according to claim 1, wherein the supporting leg locating ring and the seal ring limiting rib on the liner are directly formed on the liner.

4. The vacuum electric kettle according to claim 1, wherein the seal ring limiting rib and the clamping platform cooperate to prevent the seal ring from displacement.

5. The vacuum electric kettle according to claim 1, wherein the outer shell and the liner join up to form the kettle body, and joints are located on a top end and at a bottom end of the outer shell and the liner.

* * * * *